(12) United States Patent
Dick et al.

(10) Patent No.: US 11,036,527 B2
(45) Date of Patent: *Jun. 15, 2021

(54) CLASS SPLITTING IN OBJECT-ORIENTED ENVIRONMENTS

(71) Applicant: INTERNATIONAL BUSINESS MACHINES CORPORATION, Armonk, NY (US)

(72) Inventors: Adrian D. Dick, Southampton (GB); Howard J. Hellyer, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,344

(22) Filed: Jun. 28, 2019

(65) Prior Publication Data

US 2019/0324782 A1 Oct. 24, 2019

Related U.S. Application Data

(63) Continuation of application No. 14/940,285, filed on Nov. 13, 2015, now abandoned.

(51) Int. Cl.
| | |
|---|---|
| *G06F 9/455* | (2018.01) |
| *G06F 9/448* | (2018.01) |
| *G06F 9/54* | (2006.01) |
| *G06F 8/30* | (2018.01) |

(52) U.S. Cl.
CPC ........ *G06F 9/45516* (2013.01); *G06F 9/4491* (2018.02); *G06F 9/54* (2013.01); *G06F 8/30* (2013.01)

(58) Field of Classification Search
None
See application file for complete search history.

(56) References Cited

U.S. PATENT DOCUMENTS

| | | |
|---|---|---|
| 6,658,492 B1 | 12/2003 | Kawahara |
| 6,886,167 B1 | 4/2005 | Breslau |
| 7,949,848 B2 | 5/2011 | Wilkinson |
| 8,141,063 B2 | 3/2012 | Foley |
| 8,370,818 B2 | 2/2013 | Osminer |
| 8,707,287 B2 | 4/2014 | Raundahl Gregersen |

(Continued)

OTHER PUBLICATIONS

Sampson et al., "EnerJ: Approximate Data Types for Safe and General Low-Power Computation", PLDI' 11, Jun. 4-8, 2011, San Jose, CA, pp. 1-11.

(Continued)

*Primary Examiner* — Lewis A Bullock, Jr.
*Assistant Examiner* — Melissa A Headly
(74) *Attorney, Agent, or Firm* — Richard A. Wilhelm

(57) ABSTRACT

Embodiments of the present invention disclose a method, computer program product, and system for class splitting in object-oriented environments in which objects are created by classes. Data is analyzed, in response to generating an instance of an original class in a code component. Fields are separated into sets based on the code paths that access the fields. A split class is generated for a set of fields which shares a common interface with the original class. Cells are replaced in the code component to the original class with a split class.

13 Claims, 3 Drawing Sheets

(56) References Cited

U.S. PATENT DOCUMENTS

| | | | |
|---|---|---|---|
| 8,935,293 B2 | 1/2015 | Park | |
| 2002/0032804 A1 | 3/2002 | Hunt | |
| 2005/0071810 A1* | 3/2005 | Sutter | G06F 8/36 |
| | | | 717/116 |
| 2009/0044174 A1* | 2/2009 | Dolby | G06F 11/28 |
| | | | 717/127 |
| 2010/0138819 A1 | 6/2010 | Burka | |
| 2012/0210309 A1 | 8/2012 | Jamison | |
| 2016/0062878 A1* | 3/2016 | Westrelin | G06F 9/4552 |
| | | | 717/130 |
| 2017/0139681 A1 | 5/2017 | Dick | |
| 2017/0139683 A1 | 5/2017 | Dick | |

OTHER PUBLICATIONS

Wikipedia, "Escape Analysis", http://en.wikipedia.org/wiki/Escape_analysis . . ., printed Oct. 22, 2015, pp. 1-3.
IBM, List of IBM Patents or Patent Applications Treated as Related, Appendix P, dated Jul. 3, 2019, 2 pages.

\* cited by examiner

CLASS SPLITTING IN OBJECT-ORIENTED ENVIRONMENTS

BACKGROUND

The present invention relates generally to the field of class splitting in object-oriented environments such as programming or models, and more particularly to class splitting in order to reduce object size.

In object-oriented programming, a class is an extensible program code template for creating objects. The class provides initial values for state, or member variables, and implementations of behavior of member functions or methods. A constructor in a class is a special type of subroutine called to create an object. It prepares the new object for use and may accept arguments that the constructor uses to set required member variables.

When an object is created by a constructor of the class, the resulting object is called an instance of the class, and the member variables specific to the object are called instance variables, to contrast with the class variables shared across the class. When an instance of a class is created with required code paths taken and fields given required arguments, a number of unused fields remain which are not used by the instance of the class. Other object-oriented models, for example, Common Object Request Broker Architecture (CORBA), that is a distributed object paradigm, use similar design goals to object-oriented programming; although systems that use CORBA do not have to be object-oriented.

SUMMARY

Embodiments of the present invention disclose a method, computer program product, and system for class splitting in object-oriented environments in which objects are created by classes. Data is analyzed, in response to generating an instance of an original class in a code component. Fields are separated into sets based on the code paths that access the fields. A split class is generated for a set of fields which shares a common interface with the original class. Cells are replaced in the code component to the original class with a split class.

Figure 1:
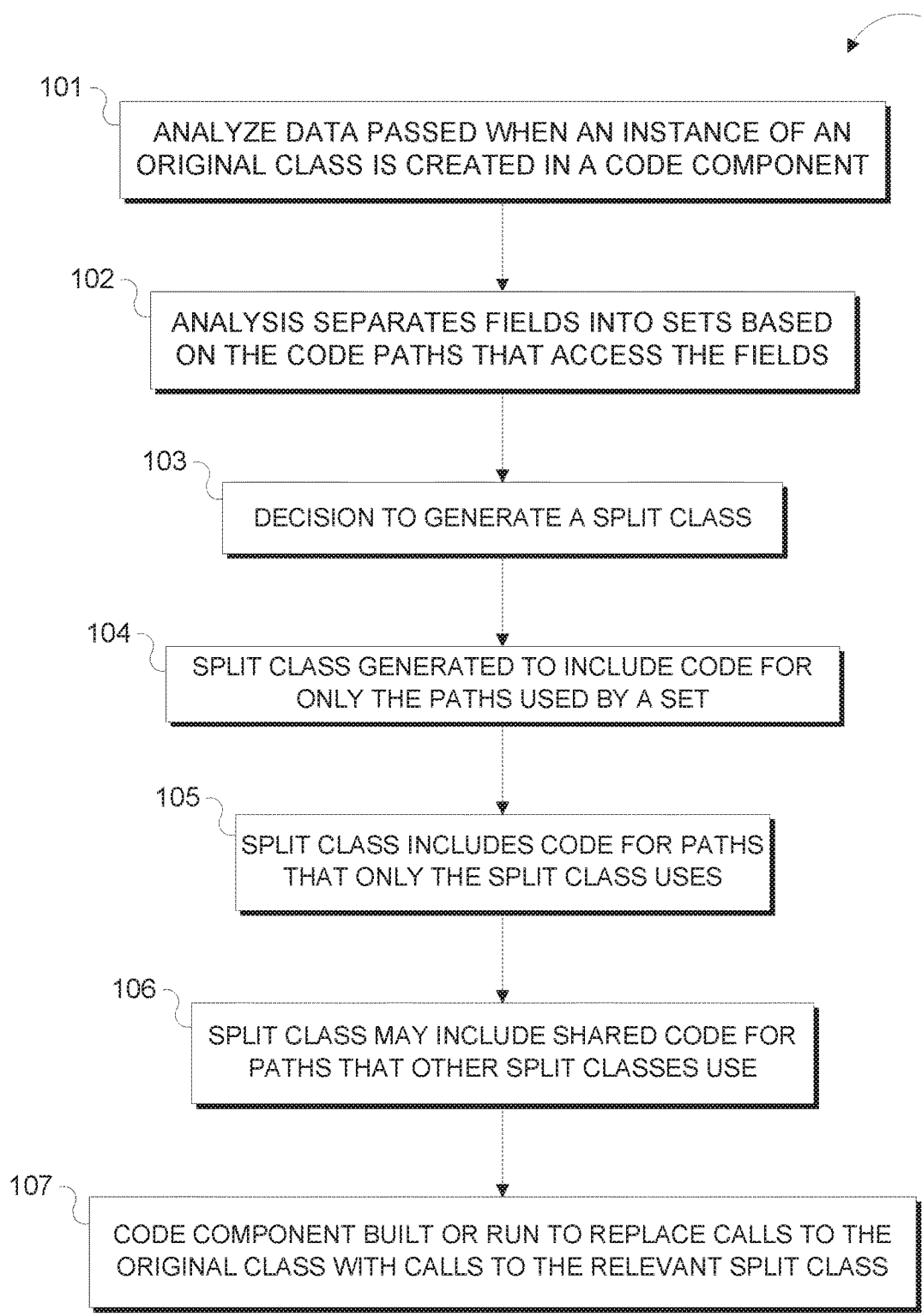
FIG. 1 is a flowchart depicting operational steps of class splitting in object oriented environments, in accordance with an embodiment of the present invention.

It should be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A mechanism is described to analyze and split class code, based on the data passed when an instance of that class may be created. This may allow the creation of split classes where only the code paths taken and fields required are provided given the arguments when the instance was created. The classes may be "split" effectively into two or more instances of a common interface. The split class may also be considered to be a divisional class or version of the original class. It should be appreciated that a divisional class may not retain all the fields and methods of the original class.

An object may be created from a class, in this instance, it is referred to as an instance of a class, or an object instance. The instances only contain the data for an object in the form of data fields and not the code. The code may be considered in the classes, meaning that object instances created from a split class may be of reduced size as they do not contain all the data fields Eliminating fields from an object with many instances may result in a significant memory footprint reduction and reduced data transmission over a network connection. In addition, the performance of code may be improved by eliminating decision points for paths that will not be taken for that instance of the object.

When considering how to optimize a class, the values of fields that are set at initialization may be used to isolate distinct code paths through the methods in a class. The fields accessed by those code paths may also be analyzed to determine which paths access associated fields. The analysis may be carried out by methods of escape analysis. Escape analysis is a method for determining the dynamic scope of pointers or wherein a program a pointer can be accessed. For example, two different constructors may take different arguments and may be viewed as creating two different split classes of that class.

After completing the analysis, the code paths that will be taken and fields accessed by instances of the class created by the different constructors may be split into sets and those sets used to generate multiple split classes.

The present invention will now be described in detail with reference to the Figures. FIG. 1 is a flowchart 100 depicting operational steps of class splitting in object oriented environments, in accordance with an embodiment of the present invention, in accordance with one embodiment of the present invention.

The method 100 illustrated in FIG. 1 may be performed on code in object-oriented environments including object-oriented programming and object-oriented models in which objects may be created by classes.

In step 101, a code analysis tool may be used to analyze data passed when an instance of an original class is created in a code component. The analysis includes analyzing code paths through methods in the original class and fields accessed by the paths. The fields accessed by those code paths are also analyzed to determine which paths access which fields. The analysis may be optimized for both code and data. However, in various embodiment the optimization may be carried out for only code or only data. For example, classes with many fields may undergo deep analysis to see if split classes can be created with reduced field numbers as they are loaded.

In step 102, the analysis may separate fields into sets based on the code paths that access the fields. This may be carried out by escape analysis with fields grouped into sets reachable from each code path.

In step 103, a decision may be taken to generate a split class based on each set. Split classes may be considered as two classes that share a common interface matching that of the original class. The decision may be taken at build or runtime and may be based on various aims such as to reduce the amount of code in the most common paths, or to reduce the size of the most common types of objects. The decision may be aided by data profiling.

In step 104, a split class may be generated to include code for only the paths used by the fields in the set it is generated for, in step 105, the code includes code for paths that only the split class uses, and, in step 106, the code may include shared code which may be copied into any split classes using the shared code or the shared code may be accessed by the split class from the original class.

In some embodiments, the original class may continue to exist. For example, the original class may still exist if this was implemented via a Just in Time compiler and some instances of the class had been created using the original definition. If a set is identified that uses all the fields, then that set may use the original class version. In other embodiments, a static compiler might not keep the original class version.

In step 107, the code component may be built or run to replace calls to the original class, which may be split with calls to the relevant split class. This may be carried out dynamically by directing calls to a method that dynamically checks instance types of an argument to choose which split class to instantiate. In various embodiments, this may be carried out statically if the type that can be passed can be determined before running, and calls may be statically directed to the split class.

The following code is an example based on a simple DataSource class that adapts Files and Sockets to one interface.

```
class DataSource {
    File file = null;
    Socket socket = null;
    int bytesRead = 0;
    DataSource(File f) {
        this.file = f;
    }
    DataSource(Socket s) {
        this.socket = s;
    }
    public byte[ ] getData( ) {
        if( file != null ) {
            // getData( ):path 1
            byte[ ] data = file.read( );
            bytesRead++;
            return data;
        } else if( socket != null) {
            //getData( ):path 2
```

-continued

```
            byte[ ] data = socket.read( );
            bytesRead++;
            return data;
        } else {
            //getData( ):path 1 + 2
            throw new NullPointerException( );
        }
    }
}
```

In various embodiments, one constructor "file" may always be null and the other "socket" may always be null, and automatic analysis may divide the fields and code into sets, ones that belong to one constructor, the other, or both. The following table, Table 1, illustrates the above described example

| Item | Set A (File Constructor) | Set B (Socket Constructor) | Set C (Shared) |
|---|---|---|---|
| field: file | X | | |
| field: socket | | X | |
| field: bytesRead | | | X |
| code: | getData( ):path 1 | getData( ):path 2 | |

Fields from sets A or B go into the split classes, for example, called DataSource$_A and DataSource$_B. Fields from set C remain will exist in both split classes.

The code for the getData( ) function may be split into two separate paths. The implementation of the getData method in DataSource$_A may contain the code on path 1 and DataSource$_B may contain the code on path 2. In various embodiments, some code may be shared. Code may either be duplicated for both split classes, or both split classes and the original may reference the same code. Code may be defined for the particular implementation.

In various embodiments, when the class DataSource is been split, calls to its constructor may be replaced by calls to the split classes. In one embodiment, this may be carried out by directing calls to a generated factory method that choses which split class to instantiate dynamically by checking the instance type of the argument. In another embodiment, if the type that is passed can be determined statically, this may be carried out by directing calls to the constructors for either one of the split classes.

A compiler may determine to split a class as described above at build or runtime according to criteria. The determining criteria may include reducing the amount of code in the most common paths and/or reducing the size of the most common types of objects created. Both of these determinations may be aided by data from profiling at runtime, profile directed recompilation, or from hints provided at build time.

In various embodiments, a most common split class may be the only type created. In the example above, if most DataSources used Files, DataSource$_A may be created. There would be no behavior difference if Socket based Datasources were implemented by using DataSource directly or DataSource$_B.

The values of the arguments passed may also be taken into account, for example, a class that takes one Boolean argument to a constructor may immediately define two paths in the same way as having two arguments of different types. If private internal fields of classes are accessed at runtime via tools, such as a reflection command in an object oriented programming language, it may be necessary to return their values. This may require the field to be defined in the generated class; however, as long as optimized classes is able to be identified, the runtime may determine that the value will be unset and return the default value (generally null or 0). The runtime may also return the original class object when queried, so the user cannot detect this modification.

As another example, an Adaptor class, that hides from a programmer whether it is reading from a file or an in memory buffer, may contain fields for the file descriptor and position in that file or a memory address to read from, the length of that region of memory and the offset within it that has been reached. An Adaptor class may contain a flag to indicate whether a file or a memory address is being used. For any given instance of this object several of the fields may be wasted. For example, using a 64 bit machine, that is likely to be 16 bytes or 24 bytes per object. If numerous instances of these objects are created then a large amount of heap space is wasted. If an object header is 24 bytes, then the total size will be 64 bytes. However, in the file case, 24 bytes (37.5%) of the space is wasted and, in the memory case, 16 bytes (24%).

In various embodiments, an Adaptor class may be generated and may create instances via a factory method that returns subclasses that may only contain the fields and methods used. However, it may not be practical to do this or the original developer may not have done so, for example, if the code is part of a third party library it may be impossible to modify directly. In an additional example, if expanding the Adaptor to allow it to adapt a network source to read from, it may not be possible to change all instances of new Adaptor(x) to AdaptorFactory.create(x) if some of those calls are in third party code that rely on the Adaptor class.

In various embodiments, private superclass fields rendered inaccessible by changes further down the type hierarchy may be eliminated. For example, from the compiler's point of view, the final class may be the sum of everything in the type hierarchy where detecting and removing redundant fields this way reduces the number of fields.

In various embodiments, certain fields may be determined to be not required in messages sent across a network link such as API calls defined by Common Object Request Broker Architecture (CORBA) or by determining that older versions of message formats with fewer fields could be used based on analysis of the code existing in the client/server. CORBA is a standard, defined by the Object Management Group designed to facilitate the communication of systems that are deployed on diverse platforms. CORBA uses an object-oriented model although the systems that use CORBA do not have to be object-oriented. The above described method may be used to save both space in memory or on disk, for example, if objects are serialized, and reduce message size for network communications.

Figure 2:
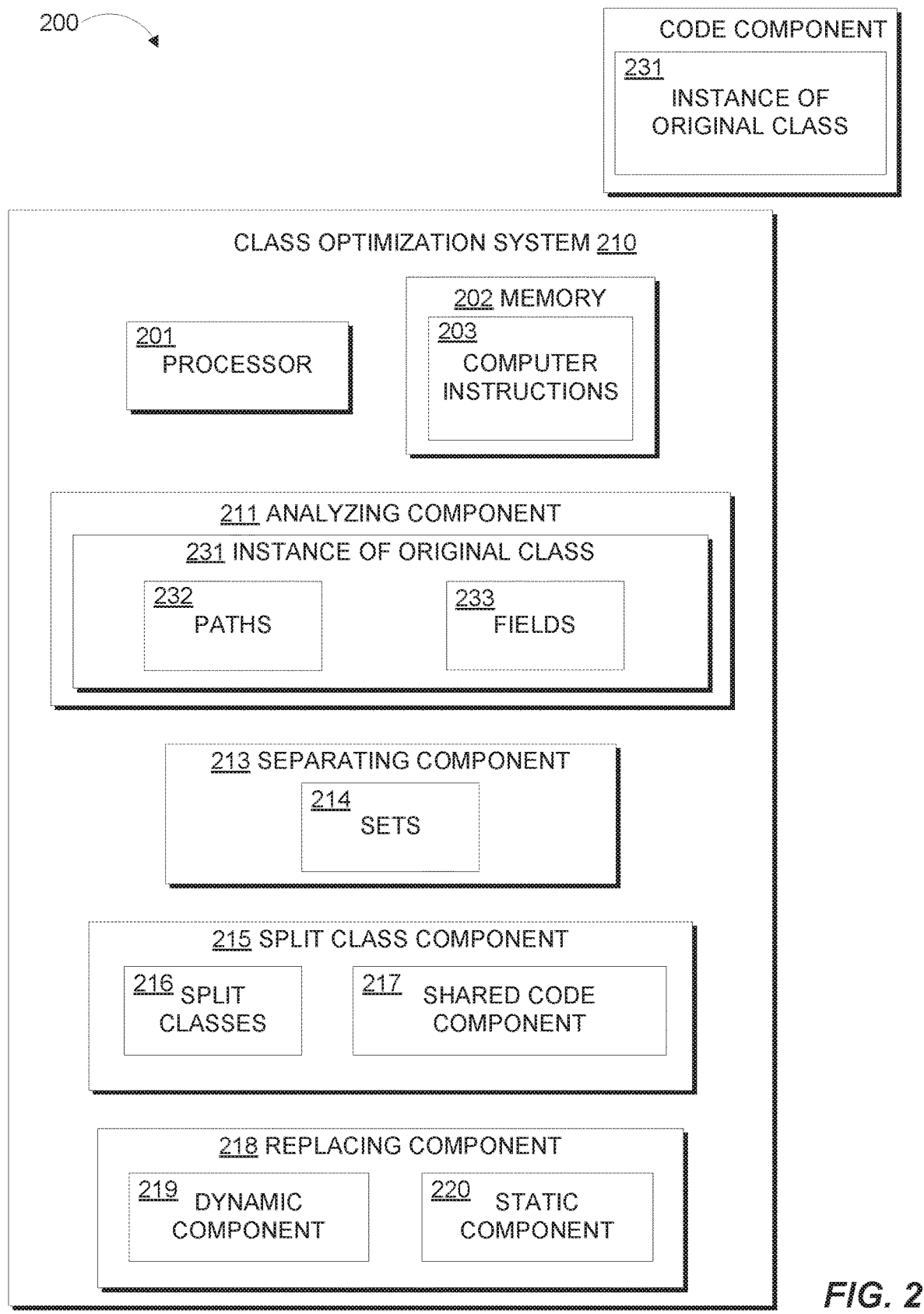
FIG. 2 is a functional block diagram illustrating a computer system, in accordance with an embodiment of the present invention.

Referring to FIG. 2, a computer system, in accordance with an embodiment of the present invention, generally designated system 200. System 200 includes class optimization system 210 and code component 230.

Class optimization system 210 includes at least one at least one processor 201, a memory 202, an analyzing component 211, a separating component 213, a split class component 215, a replacing component 218, a hardware module, or a circuit for executing the functions of the described components which may be software units executing on the at least one processor.

Memory 202 may be configured to provide computer instructions 203 to the at least one processor 201 to carry out the functionality of the components. The components may be arranged to carry out the described functionality.

The class optimization system 210 providing the described class optimization may be invoked statically at build time or dynamically at runtime, for example, via a just-in-time (JIT) compiler.

An analyzing component 211 may be provided for analyzing an instance 231 of an original class in a code component 230. The analyzing component 211 may be provided separately to the class optimization system 210.

In one embodiment, the analyzing component 211 provides the analysis phase within an integrated development environment (IDE) code analysis tool, for example, to advise when large numbers of fields of large amounts of code are unused in common cases.

The analyzing component 211 may analyze the instance of original class 231 in the code component 230 to analyze data passed when an instance of an original class is created in a code component. The analysis may include analyzing code paths 232 through methods in the original class and fields 233 accessed by the paths.

The class optimization system 210 may include a separating component 213 for separating fields into sets 214 based on the code paths that access the fields.

The class optimization system 210 may include a split class component 215 which may decide to generate a split class 216 based on each set 214. Split classes 216 may share a common interface. The decision may be taken at build or runtime and may be based on various aims such as to reduce the amount of code in the most common paths, or to reduce the size of the most common types of objects.

A split class 216 may be generated to include code for only the paths 232 used by the fields 233 in the set 214 it is generated for. The code may include code for paths that only the split class uses and may also include shared code. The split class component 215 may include a shared code component 217 which may copy any shared code into split classes 216 or may provide access to the shared code from the original class.

The class optimization system 210 may include a replacing component 218 in which the code component may then be built or run with replacement of calls to the original class which has been split with calls to the relevant split class. This may be carried out dynamically by a dynamic component 219 by directing calls to a method that dynamically checks instance types of an argument to choose which split class to instantiate. Alternatively, this may be carried out statically by a static component 220 if the type that can be passed can be determined before running, and calls can be statically directed to the split class.

Figure 3:
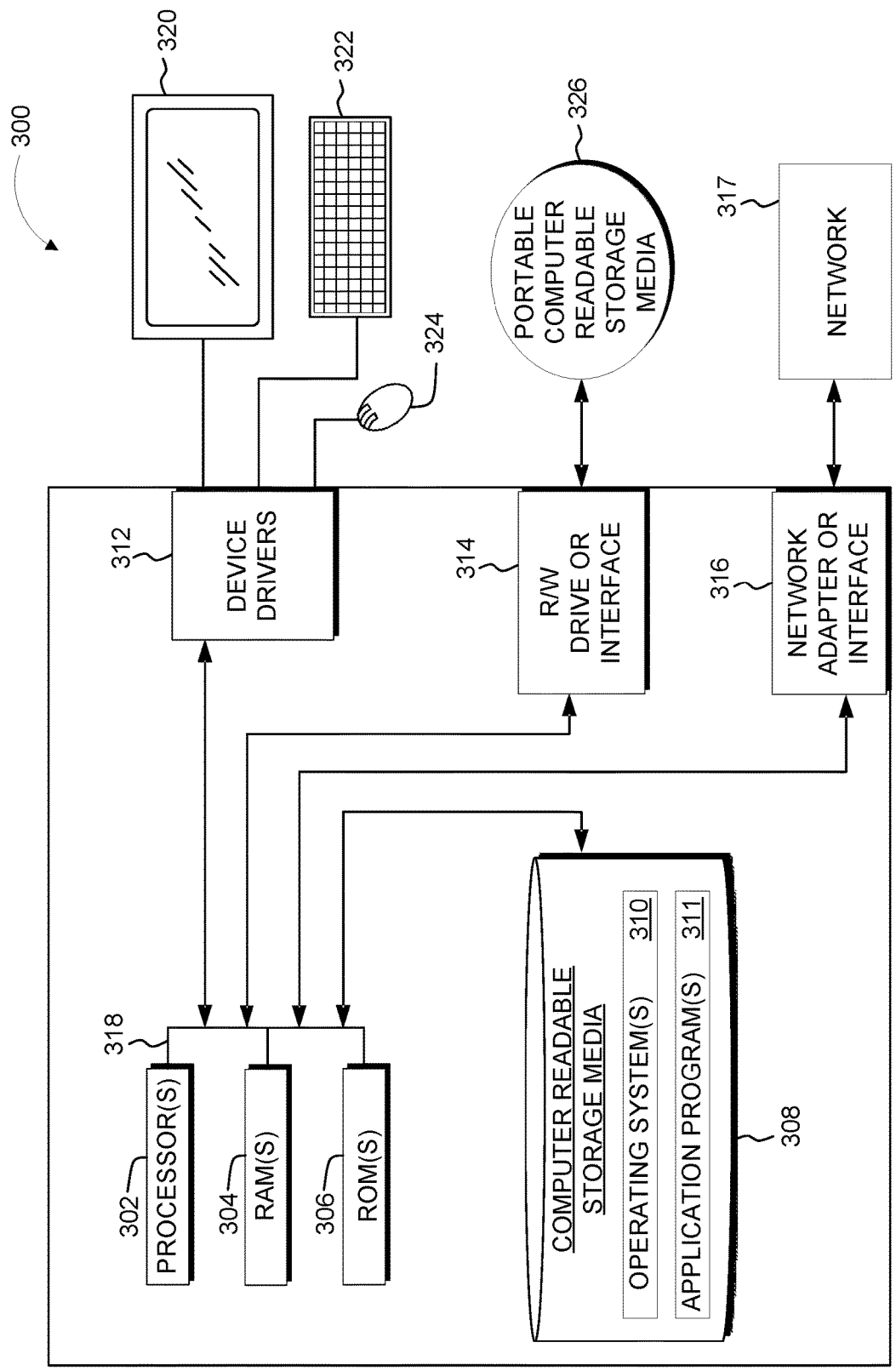
FIG. 3 depicts a block diagram of components of a computer system, in accordance with an embodiment of the present invention.

Referring now to FIG. 3, a schematic of an example of a system 300 in the form of a computer system or server is shown.

A computer system or server 300 may be operational with numerous other general purpose or special purpose computing system environments or configurations. Examples of well-known computing systems, environments, and/or configurations that may be suitable for use with computer system/server 300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 300 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 300 may be practiced in distributed cloud computing environments where tasks are performed by remote processing devices that are linked through a communications network. In a distributed cloud-computing environment, program modules may be located in both local and remote computer system storage media including memory storage devices.

FIG. 3 depicts a block diagram of components of a computing device 300 capable of performing the above described method for class splitting in object-oriented environments, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 300 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311 are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 300 may also include a R/W drive or interface 314 to read from and write to one or more portable computer readable storage media 326. Application programs 311 on computing device 300 may be stored on one or more of the portable computer readable storage media 326, read via the respective R/W drive or interface 314 and loaded into the respective computer readable storage media 308.

Computing device 300 may also include a network adapter or interface 316, such as a TCP/IP adapter card or wireless communication adapter (such as a 4G wireless communication adapter using OFDMA technology) for connection to a network 317. Application programs 311 on computing device 300 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 300 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for class splitting in object-oriented environments in which objects are created by classes, the method comprising:
  in response to generating an instance of an original class in a code component, analyzing data, wherein the analyzed data is passed when the instance of the original class is created in the code component;
  in response to dynamically determining a scope of pointers for the analyzed data, determining code paths associated with accessing fields in the code component;
  separating the fields into sets based on the code paths determined to be associated with the accessed fields;
  generating a split class at runtime for a set of fields which shares a common interface with the original class, wherein the generating the split class is based on a subset of the set of fields and the code paths determined to be associated with accessing the fields, wherein the generating a split class further comprises:
    adding code for paths utilized by the split class, and
    adding shared code, wherein the shared code is from the original class;
  dynamically determining an argument type associated with the generated split class;
  identifying one or more system calls for the original class, the system calls comprising a service request;
  in response to identifying the one or more system calls for the original class, replacing calls in the code component to the original class with calls to the split class;
  in response to determining a number of fields used in the set of fields crosses a threshold, replacing calls in the code component to the split class with calls to the original class; and
  generating a second split class at runtime for a first constructor that includes a second argument type from a second constructor of the original class, wherein calls to the first constructor are replaced by calls to the generated second split class.

2. The method of claim 1, wherein analyzing data further comprises:
  analyzing code paths in the original class in the code component; and
  analyzing fields accessed by the code paths.

3. The method of claim 1, wherein replacing calls in the code component is carried out dynamically by checking instance types of an argument to choose which split class to instantiate.

4. The method of claim 1, wherein replacing calls in the code component is carried out before running the code component, and calls are statically directed to a split class.

5. The method of claim 1, wherein analyzing data is carried out to optimize one or both of code and data.

6. The method of claim 1, wherein the analyzing of data passed when an instance of an original class is created is carried out dynamically at runtime via a just in time (JIT) compiler.

7. The method of claim 1, wherein a split class eliminates decision points for paths not taken for that instance of the object and unused fields are removed from split classes.

8. The method of claim 1, wherein a single split class is generated in response to a majority of calls using a single code path.

9. The method of claim 1, wherein separating fields into sets further comprises performing escape analysis based on one or more fields grouped into a plurality of sets reachable from each code path.

10. A computer program product for class splitting in object-oriented environments in which objects are created by classes, the computer program product comprising:
one or more non-transitory computer-readable storage media and program instructions stored on the one or more computer-readable storage media, the program instructions comprising:
instructions to analyze data responsive to instructions to generate an instance of an original class in a code component, wherein the analyzed data is passed when the instance of the original class is created in the code;
in response to instructions to dynamically determine a scope of pointers for the analyzed data, instructions to determine code paths associated with accessing fields in the code component;
instructions to separate the fields into sets based on the code paths determined to be associated with the accessed fields;
instructions to generate a split class at runtime for a set of fields which shares a common interface with the original class, wherein the instructions to generate the split class is based on a subset of the set of fields and the code paths determined to be associated with accessing the fields, wherein the instructions to generate a split class further comprises:
instructions to add code for paths utilized by the split class, and
instructions to add shared code, wherein the shared code is from the original class;
instructions to dynamically determine an argument type associated with the generated split class;
instructions to identify one or more system calls for the original class, the system calls comprising a service request;
in response to instructions to identifying the one or more system calls for the original class, instructions to replace calls in the code component to the original class with calls to the split class;
in response to instructions to determining that a number of fields used in the set of fields crosses a threshold, instruction to replace calls in the code component to the split class with calls to the original class; and
instructions to generate a second split class at runtime for a first constructor that includes a second argument type from a second constructor of the original class, wherein calls to the first constructor are replaced by calls to the generated second split class.

11. The computer program product of claim 10, wherein analyzing data further comprises:
instructions to analyze code paths in the original class in the code component; and
instructions to analyze fields, wherein the fields are accessed by the code paths.

12. The computer program product of claim 10, wherein replacing calls in the code component is carried out dynamically by checking instance types of an argument to choose which split class to instantiate.

13. A computer system for class splitting in object-oriented environments in which objects are created by classes, the computer system comprising:
one or more computer processors;
one or more computer-readable storage media;
program instructions stored on the computer-readable storage media for execution by at least one of the one or more processors, the program instructions comprising:
instructions to analyze data responsive to instructions to generate an instance of an original class in a code component, wherein the analyzed data is passed when the instance of the original class is created in the code;
in response to instructions to dynamically determine a scope of pointers for the analyzed data, instructions to determine code paths associated with accessing fields in the code component;
instructions to separate the fields into sets based on the code paths determined to be associated with the accessed fields;
instructions to generate a split class at runtime for a set of fields which shares a common interface with the original class, wherein the instructions to generate the split class is based on a subset of the set of fields and the code paths determined to be associated with accessing the fields, wherein the instructions to generate a split class further comprises:
instructions to add code for paths utilized by the split class, and
instructions to add shared code, wherein the shared code is from the original class;
instructions to dynamically determine an argument type associated with the generated split class;
instructions to identify one or more system calls for the original class, the system calls comprising a service request;
in response to instructions to identifying the one or more system calls for the original class, instructions to replace calls in the code component to the original class with calls to the split class;
in response to instructions to determining that a number of fields used in the set of fields crosses a threshold, instruction to replace calls in the code component to the split class with calls to the original class; and
instructions to generate a second split class at runtime for a first constructor that includes a second argument type from a second constructor of the original class, wherein calls to the first constructor are replaced by calls to the generated second split class.

* * * * *